United States Patent [19]
Jones et al.

[11] Patent Number: 5,268,555
[45] Date of Patent: Dec. 7, 1993

[54] APPARATUS AND METHOD FOR LASER JOINING 218 BIMETAL TO MOLDED CASE CIRCUIT BREAKER (MCCB) HOOKS AND TERMINALS

[75] Inventors: Marshall G. Jones, Scotia, N.Y.; Joseph Criniti, New Britain, Conn.; Jose A. Solero, San German, P.R.

[73] Assignee: General Electric Company, Schenectady, N.Y.

[21] Appl. No.: 936,995

[22] Filed: Aug. 31, 1992

[51] Int. Cl.5 ............................................. B23K 26/00
[52] U.S. Cl. ............................................... 219/121.63
[58] Field of Search ....................... 219/121.63, 121.64

[56] References Cited

U.S. PATENT DOCUMENTS

| | | | |
|---|---|---|---|
| 3,908,110 | 9/1975 | Heft | 219/121.85 |
| 3,953,812 | 4/1976 | Heft et al. | 335/23 |
| 4,274,043 | 6/1981 | Heitz | 320/6 |

Primary Examiner—C. L. Albritton
Attorney, Agent, or Firm—James R. McDaniel; Paul R. Webb, II

[57] ABSTRACT

This invention relates to laser joining of dissimilar materials in order to form an integral structure. Structures of this type, generally, allow circuit breaker components, which are constructed of different materials, to be joined together in order to form an integral circuit breaker.

8 Claims, 2 Drawing Sheets

APPARATUS AND METHOD FOR LASER JOINING 218 BIMETAL TO MOLDED CASE CIRCUIT BREAKER (MCCB) HOOKS AND TERMINALS

BACKGROUND OF THE INVENTION

1. Field of the Invention

This invention relates to laser joining of dissimilar materials in order to form an integral structure. Structures of this type, generally, allow circuit breaker components, which are constructed of different materials, to be joined together in order to form an integral circuit breaker.

2. Description of the Related Art

The current process for joining dissimilar material components is projection welding, a form of resistance welding. In this case, the terminal and hook components have their mating parts dimpled to help direct the current to a specific location during the projection welding process. Dimples provide a region of high current densities to form and pressure contacts where the welds are actually made. With properly dressed electrodes, sufficient pressure, and adequately cleaned joints, a reliable weld can be made. But, since these conditions are not always maintained in a manufacturing environment, product yield can be inconsistent and very low at times. This is particularly the case if the shape of the electrodes are not maintained. Therefore, it would be advantageous if the amount of weld yield could be increased.

It is apparent from the above that there exists a need in art for a joining system which is capable of welding dissimilar materials, and which at the same time can produce a high amount of yield. It is a purpose of this invention to fulfill this and other needs in the art in a manner more apparent to the skilled artisan once given the following disclosure.

SUMMARY OF THE INVENTION

Generally speaking, this invention fulfills these needs by providing an apparatus for joining circuit breaker components, comprising a circuit breaker hook means, a circuit breaker terminal means located at a predetermined distance away from said hook means, a bimetal connection means located between said hook means and said terminal means, a laser means, and a first and second joint means wherein said first joint means is substantially located between said hook means and said bimetal connection means such that said first joint means is formed by said laser means and is constructed substantially of a portion of said hook means and a portion of said bimetal connection means and said second joint means substantially located between said terminal means and said bimetal connection means such that said second joint means is formed by said laser means and is constructed substantially of a portion of said terminal means and a portion of said bimetal connection means.

In certain preferred embodiments, the hook means is constructed of copper or silvered copper. Also, the terminal means is constructed of phosphor bronze. Also, the connection means is constructed of a nickel(34)-iron(64)-nickel based alloy or a manganese-based alloy bimetal. Finally, the laser means is a Nd:YAG laser with and without a fiber optic beam delivery system.

In another further preferred embodiment, structurally sound dissimilar material welded joints are formed with a non-contact welding technique in a quick and efficient manner.

The preferred dissimilar material joining system, according to this invention, offers the following advantages: increased yield; excellent weldment characteristics; good durability; good stability; good economy; and high strength for safety. In fact, in many of the preferred embodiments, these factors of increased yield and excellent weldment characteristics are optimized to an extent that is considerably higher than heretofore achieved prior, known bimetallic joining systems.

BRIEF DESCRIPTION OF THE DRAWINGS

The above and other features of the present invention which will be more apparent as the description proceeds are best understood by considering the following detailed description in conjunction with the accompanying drawings wherein like character represent like parts throughout the several veins and in which.

DETAILED DESCRIPTION OF THE INVENTION

Figure 1A:
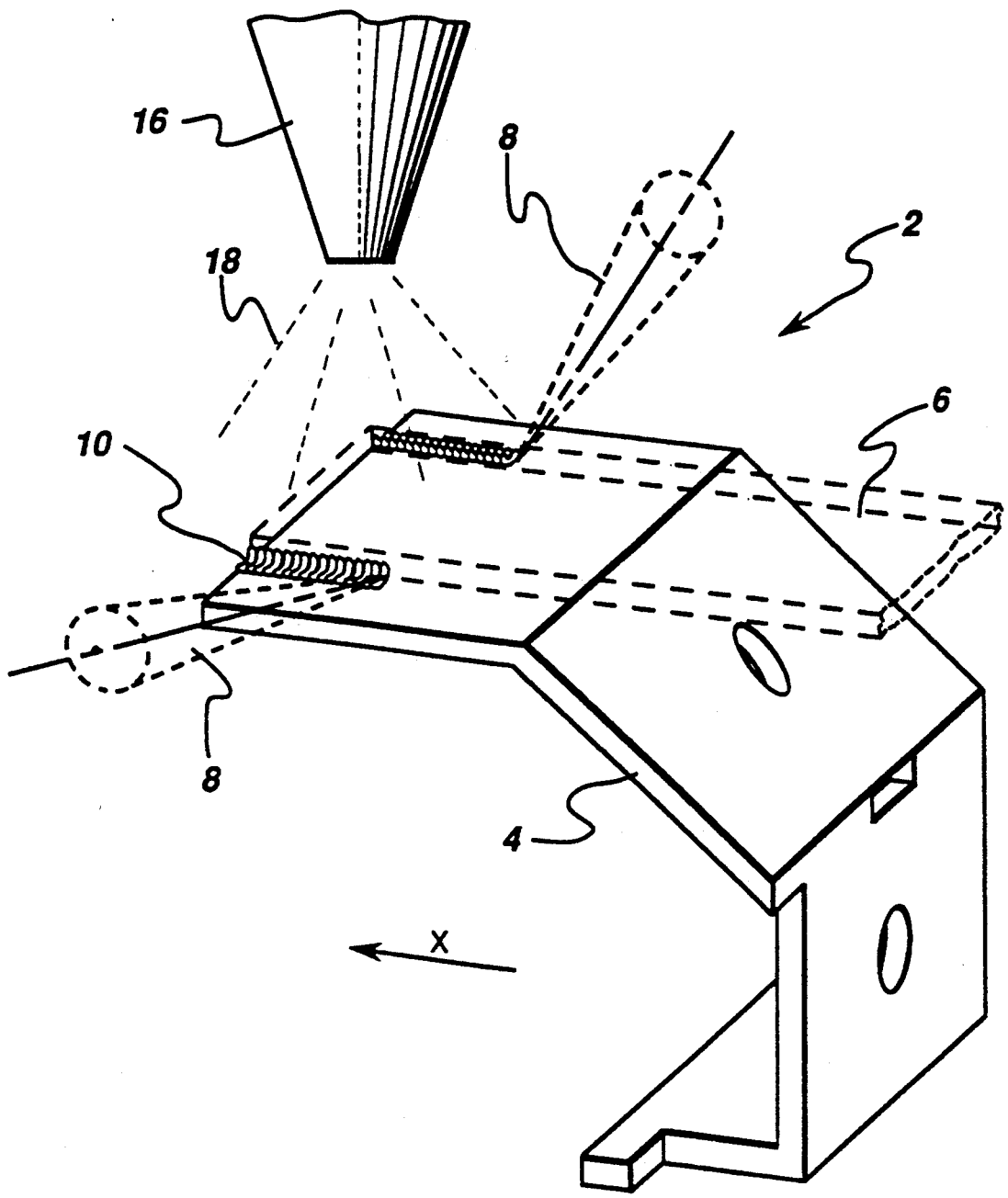
FIG. 1a is a schematic illustration of a laser system for joining a bimetallic material to a circuit breaker terminal, according to the present invnetion.
Figure 1B:
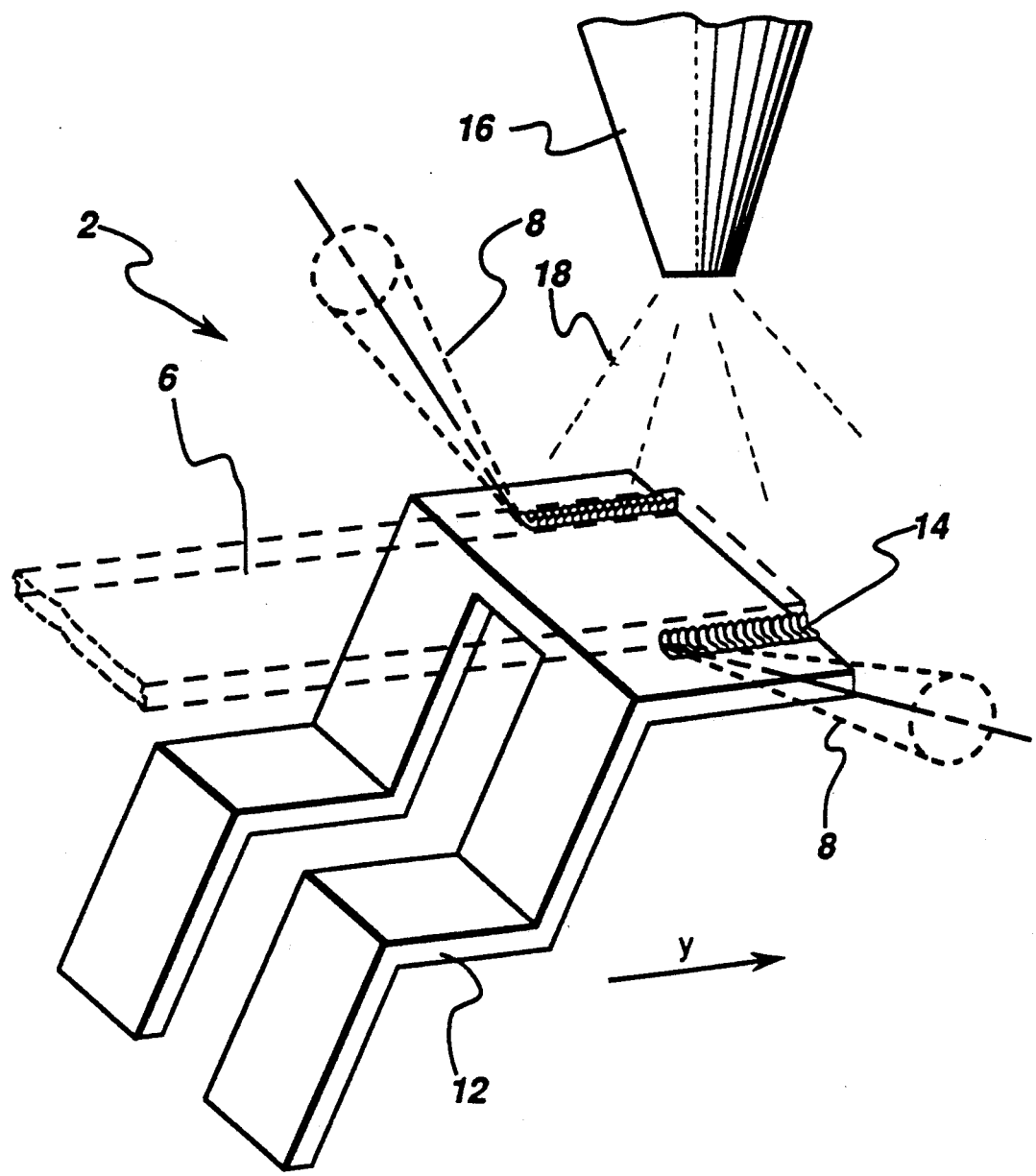
FIG. 1b is a schematic illustration of a laser system for joining a bimetallic material to a molded case circuit breaker (MCCB) hook, according to the present invention.

On the outset, it should be explained that while two figures are shown, namely, FIGS. 1a and 1b, it is to be understood that both terminal 4 and hook 12 are welded to the opposite ends of the bimetal connection 6 in order to form a complete circuit breaker.

With reference to FIG. 1a, there is illustrated laser dissimilar material joining system 2. Laser system 2 includes, in part, terminal 4, bimetal connection 6, laser beam 8, weldment 10, gas source nozzle 16 and gas 18. In particular, terminal 4, preferably, is constructed of phosphor bronze. Connection 6, preferably, is constructed of a nickel(34)-iron(64)-nickel based alloy bimetal. Laser beam 8, preferably, is formed by a conventional Nd:YAG laser that operates with and without a fiber optic beam delivery system. Gas nozzle 16, preferably, is a conventional inert gas nozzle. Gas 18, preferably, is any suitable inert gas, such as $N_2$.

FIG. 1b illustrates the joining of MCCB hook 12 to bimetal connection 6. FIG. 1b, includes, in part, bimetal connection 6, laser beam 8, MCCB hook 12, weldment 14, gas nozzle 16 and gas 18. In particular, hook 12, preferably, is constructed of copper or silvered copper. Laser beam 8 is formed by the same techniques that were used to form laser beam 8 in FIG. 1a. Gas nozzle 16 and gas 18, preferably, are the same as employed in FIG. 1a.

During the operation of system 2, terminal 4 is rigidly held to one end of bimetal connection 6 by a conventional clamp (not shown). Hook 12 is also rigidly held to the other end of connection 6 by a conventional clamp (not shown). After terminal 4 and hook 12 are clamped to bimetal connection 6, this subassembly is moved past laser beam 8. As can be seen in FIG. 1a, terminal 4 and bimetal connection 6 are moved along the direction of arrow X past laser beam 8 in order to form weldments 10. Also, as can be seen in FIG. 1b, hook 12 and bimetal connection 6 are moved in the direction of arrow Y past laser means 8 in order to form weldments 14. As this subassembly moves past laser beams 8, a conventional laser (not shown) which operates at pulse lengths of between 7-9 ms, a frequency (pulse rate) of 5 pps, an energy 30 J/pulse, and a speed of 50 mms/min. produces laser beams 8. It is to be understood that terminal 4, bimetal connection 6 and hook 12 can remain stationary while laser beams 8 are moved.

As can be seen, this approach allows the operator to autogenously lap weld components of circuit breakers that are made of dissimilar materials. This structurally sound weld is accomplished by providing mixing of the materials in the weld zone, even though, the weldability of the materials of the components of the circuit breakers is not at all good. The use of a laser allows for some mixing of the dissimilar materials by varying the pulse length. Using the laser in the pulse mode provides for higher peak energy and subsequent deeper weld penetration than a continuous wave laser. The pulse mode is important when addressing high terminal conductivity materials such as bronze and copper. Overlapping laser spot welds are used to make a continuous lap or skip weld of the required length. It is to be understood, that the two lap welds 10 and 14 could be made simultaneously by this system 2. By providing a mode of mixing and minimizing oxidation effects through the use of a conventional inert gas such as $N_2$, joint ductility is increased, thus decreasing the propensity for brittle failure during a conventional bending test or when in operation.

Once given the above disclosure, many other features, modification or improvements will become apparent to the skilled artisan. Such features, modifications or improvements are, therefore, considered to be a part of this invention, the scope of which is to be determined by the following claims.

What is claimed is:

1. An apparatus for joining circuit breaker components, said apparatus comprised of:
   a circuit breaker terminal means;
   a hook means located at a predetermined distance away from said terminal means;
   a bimetal connection means located between said terminal means and said hook means wherein said bimetal is further comprised of a nickel(34)-iron(64)-nickel based alloy or manganese-based alloy bimetal; a laser means; and
   a first and second joint means wherein said first joint means is substantially located between said terminal means and said connection means such that said first joint means is formed by said laser means and is constructed substantially of a portion of said terminal means and a portion of said connection means and said second joint means is substantially located between said hook means and said connection means such that said second joint means is formed by said laser means and is constructed substantially of a portion of said hook means and a portion of said connection means.

2. The apparatus, as in claim 1, wherein said terminal means is further comprised of:
   phosphor bronze.

3. The apparatus, as in claim 1, wherein said hook means is further comprised of:
   a molded case circuit breaker hook means.

4. The apparatus, as in claim 3, wherein said hook means is further comprised of:
   copper or silvered copper.

5. The apparatus, as in claim 1, wherein said laser means is further comprised of:
   a Nd:YAG laser.

6. The apparatus, as in claim 1, wherein said first and second joint means are further comprised of:
   lap weldments.

7. A method for joining circuit breaker components including a circuit breaker terminal means, a hook means, a bimetal connection means, a laser means, wherein said method is comprised of the steps of:
   retaining said terminal means to said connection means;
   retaining said hook means to said connection means such that said hook means is located at a predetermined distance away from said terminal means;
   operating said laser means;
   traversing said laser means past said terminal means and said connection means to form a first joint means which is constructed substantially of a portion of said terminal means and said connection means wherein said steps of traversing said laser means is further comprised of the step of traversing said laser means at approximately 50 mm/min; and
   traversing said laser means past said hook means and said connection means to form a second joint means which is constructed substantially of a portion of said hook means and a portion of said connection means wherein said steps of traversing said laser means is further comprised of the step of traversing said laser means at approximately 50 mm/min.

8. A method, as in claim 7, where said step of operating laser is further comprised of the steps of:
   operating an oxidation reduction means;
   pulsing said laser system to approximately 7-9 ms;
   operating said laser system at a frequency of approximately 5 pps; and
   operating said laser system at an energy of approximately 30 J pulse.

* * * * *